(12) United States Patent
Hummel

(10) Patent No.: US 10,746,259 B2
(45) Date of Patent: Aug. 18, 2020

(54) DUAL CLUTCH TRANSMISSION FOR A MOTOR VEHICLE

(71) Applicant: AUDI AG, Ingolstadt (DE)

(72) Inventor: Steffen Hummel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 522 days.

(21) Appl. No.: 15/551,982

(22) PCT Filed: Jan. 20, 2016

(86) PCT No.: PCT/EP2016/051088
§ 371 (c)(1),
(2) Date: Aug. 18, 2017

(87) PCT Pub. No.: WO2016/131591
PCT Pub. Date: Aug. 25, 2016

(65) Prior Publication Data
US 2018/0031081 A1    Feb. 1, 2018

(30) Foreign Application Priority Data
Feb. 19, 2015  (DE) .................. 10 2015 002 134

(51) Int. Cl.
*F16H 3/089* (2006.01)
*F16H 3/00* (2006.01)
*F16H 3/08* (2006.01)

(52) U.S. Cl.
CPC ............ *F16H 3/006* (2013.01); *F16H 3/089* (2013.01); *F16H 2003/0803* (2013.01);
(Continued)

(58) Field of Classification Search
CPC .. F16H 3/006; F16H 3/089; F16H 2003/0803; F16H 2003/0818;
(Continued)

(56) References Cited

U.S. PATENT DOCUMENTS

2014/0013881 A1    1/2014  Luebke et al.

FOREIGN PATENT DOCUMENTS

| CN | 101398078 A | 4/2009 |
| CN | 103097769 A | 5/2013 |

(Continued)

OTHER PUBLICATIONS

Chinese Office Action dated Dec. 29, 2018, in connection with corresponding CN Application No. 201680010755.7 (10 pgs., including machine-generated English translation).

(Continued)

*Primary Examiner* — William C Joyce
(74) *Attorney, Agent, or Firm* — Maier & Maier, PLLC

(57) ABSTRACT

A dual clutch transmission for a motor vehicle provided with gearwheels sets that are shiftable via switching elements, which form in particular exactly eight wheel planes, which are respectively assigned to a first sub-transmission and to a second sub-transmission, among which each sub-transmission is provided with an input shaft and both sub-transmissions are provided with a common output shaft. The input shafts, which are coaxial to each other, can be alternately activated via a load-shiftable clutch, and the odd forward gears are assigned to the first sub-transmission and the even forward gears are assigned to the second sub-transmission, which can be shifted during a gear shift by means of the switching elements.

12 Claims, 2 Drawing Sheets

(52) U.S. Cl.
CPC ................ *F16H 2003/0818* (2013.01); *F16H 2003/0822* (2013.01); *F16H 2003/0826* (2013.01); *F16H 2200/0078* (2013.01)

(58) Field of Classification Search
CPC ..... F16H 2003/0822; F16H 2003/0826; F16H 2200/0078
USPC .......................................................... 74/330
See application file for complete search history.

(56) References Cited

FOREIGN PATENT DOCUMENTS

| | | |
|---|---|---|
| CN | 103711845 A | 4/2014 |
| DE | 102010040660 A1 | 3/2012 |
| DE | 102011089167 A1 | 6/2013 |
| DE | 102012013248 A1 | 1/2014 |
| DE | 102012219437 A1 | 4/2014 |
| DE | 10 2013 204 776 A1 | 9/2014 |
| JP | 2010-038229 A | 2/2010 |

OTHER PUBLICATIONS

International Search Report dated May 4, 2016 of corresponding International application No. PCT/EP2016/051088; 25 pgs.
International Preliminary Report on Patentability dated Jun. 8, 2017 of corresponding International application No. PCT/EP2016/051088; 20 pgs.
Notification of Transmittal of Translation of the International Preliminary Report on Patentability dated Aug. 24, 2017, in connection with corresponding international application No. PCT/EP2016/051088 (20 pages).

Fig. 2

| G | K1 | K2 | RE-1 | RE-2 | RE-3 | RE-4 | RE-5 | RE-6 | RE-7 | RE-8 | SE-A | SE-B | SE-C | SE-D | SE-E | SE-F |
|---|----|----|------|------|------|------|------|------|------|------|------|------|------|------|------|------|
| 1 | X  |    |      |      |      |      |      |      |      |      | re   | ii   |      |      |      |      |
| 1 |    | X  | X    | X    |      |      | X    |      |      |      |      |      | ii   |      |      | re   |
| 2 |    | X  | X    | X    |      |      |      |      |      |      |      | ii   | ii   | re   |      |      |
| 3 | X  |    |      |      | X    |      | X    |      |      |      | ii   |      |      |      |      |      |
| 3 |    | X  |      | X    | X    |      | X    |      |      |      |      |      | re   | re   |      |      |
| 4 |    | X  | X    |      |      |      |      |      |      | X    | re   |      | re   |      |      |      |
| 5 | X  |    |      | X    |      |      |      |      | X    |      | ii   |      | ii   |      | ii   |      |
| 6 |    | X  |      | X    |      |      |      |      | X    | X    |      |      | re   |      |      | ii   |
| 7 | X  |    | X    |      |      |      |      |      | X    | X    | re   |      | ii   |      | ii   | ii   |
| 8 |    | X  |      |      |      | X    |      | X    |      |      |      | re   | ii   |      |      |      |
| 9 | X  |    |      |      |      |      |      | X    |      |      | ii   | re   |      | ii   |      |      |
| 10|    | X  |      |      |      | X    |      |      |      |      |      |      | re   |      |      |      |
| 11| X  |    |      |      |      |      |      |      |      |      |      |      |      |      |      |      |
| 12|    | X  |      |      |      |      |      |      |      |      |      |      |      |      |      |      | ns with a good efficiency and other advantages, they also have the advantage that they are automatically switchable without an interruption of the tractive force, wherein a gear stage can be preselected already in a respective non-activated sub-transmission, which is then activated by the selection of the load-shiftable clutches. In this case, the odd gears (1, 3, 5, etc.) are positioned in one sub-transmission, and in another sub-transmission are positioned the even gears (2, 4, 6, etc.) by means of corresponding gearwheel sets, which are for example drivingly connected via synchronous clutches to the respective input shafts or output shafts.

DUAL CLUTCH TRANSMISSION FOR A MOTOR VEHICLE

FIELD

The present invention relates to a dual clutch transmission for a motor vehicle according to the preamble of the patent claim.

BACKGROUND

Such dual clutch transmissions have been often used in motor vehicles. In addition to a good efficiency and other advantages, they also have the advantage that they are automatically switchable without an interruption of the tractive force, wherein a gear stage can be preselected already in a respective non-activated sub-transmission, which is then activated by the selection of the load-shiftable clutches. In this case, the odd gears (1, 3, 5, etc.) are positioned in one sub-transmission, and in another sub-transmission are positioned the even gears (2, 4, 6, etc.) by means of corresponding gearwheel sets, which are for example drivingly connected via synchronous clutches to the respective input shafts or output shafts.

With current dual clutch transmission, the input shafts of the first sub-transmission are non-rotationally arranged on the first sub-transmission and of the second sub-transmission so that they are arranged non-rotatably on the respective wheel planes. In order to ensure a flawless torque flow with the dual clutch transmission, the input shafts must be designed in a materially intensive manner. In addition, all of the fixed wheel of each activated input shaft are rotated during the driving operations, which results in a high inertial torque of the activated sub-transmission.

SUMMARY OF THE DISCLOSURE

The object of the invention is to provide a dual clutch transmission, which provides with a structurally advantageous construction a greater degree of freedom and functionality (shifting strategy) and which has an advantageous design of the gear stages.

According to the disclosure, the output shaft is provided with one switching element, in particular a switching element SE-F, which is switchable in the axial direction, by means of which the three wheel planes of the respective sub-transmissions can be coupled to or decoupled from the output shaft.

According to the invention, the output shaft therefore does not support any fixed gearwheels of the wheel planes of the sub-transmission. As a result, the output shaft can be designed with a significantly reduced amount of the material in comparison to the prior art mentioned above. In addition, by means of the first switching element SE-F, wheel planes can be at least partially decoupled (which is to say deactivated) from the activated sub-transmission, wherein the inertial torque of the activated sub-transmission can be reduced. This leads to a shortened switching time period during the gear switching, or to a reduction of the energy that is required for the switching operation.

The first switching element SE-F, which is preferably arranged on the output side, can be provided on both sides in the axial direction with a respective output-side loose gearwheel mounted on the output shaft that is provided with the three wheel planes mentioned above of the first sub-transmission and with a drive-side hollow shaft, which is coaxially and rotatably mounted on the opposite side on the output shaft. The output-side hollow shaft of the first sub-transmission as well as the output-side loose gearwheel can be coupled by means of the first switching element SE-F alternated with the output shaft. On the hollow shaft can be non-rotatably arranged the output-side gearwheels of the both other wheel planes RE-1, RE-2.

The first sub-transmission can be additionally provided with a fourth wheel plane, whose output-side gearwheel can be arranged non-rotatably on the output shaft. On the input side of the first sub-transmission can provided exactly one switching element, in particular a second switching element SE-C, which is switchable on both sides and arranged in the axial direction. By means of the second switching element SE-C, the first input shaft can be coupled to or decoupled from the wheel planes of the first sub-transmission.

In a technical implementation, the second switching element, which is switchable on both sides, can be connected either to the loose gearwheel of the first wheel plane mounted on the first input shaft, or to a hollow shaft coaxially mounted on an input shaft, which is drivingly connected to the first input shaft. The drive-side mounted on the first input shaft can preferably support the drive-side fixed gearwheel of the second and of the third wheel plane. In addition, on the drive-side hollow shaft of the first sub-transmission can be loosely mounted a drive-side gearwheel of the fourth wheel plane. The drive-side gearwheel of the fourth wheel plane can be coupled via a third switching element to the drive-side hollow shaft of the first sub-transmission.

In a development of the invention, a fifth wheel plane, which is immediately adjacent to the first sub-transmission in axial direction, can be assigned to the first sub-transmission. The fifth wheel plane can be provided with a drive-side gearwheel, which is rotatably mounted on the second input shaft and preferably can be coupled by means of the switching element mentioned above to the first sub-transmission. The fifth wheel plane can be thus switched in this manner to both sub-transmissions.

As mentioned above, the first input shaft of the first sub-transmission can be provided with exactly one switching element, which is preferably switchable on both sides. Similarly, the second input shaft of the second sub-transmission can be also provided with a switching element SE-A, which is switchable on both sides. By means of the fourth switching element, the second input shaft can be coupled to or decoupled from the wheel planes of the second partial transmission.

The fourth element supported by the second input shaft can be in a technical implementation drivingly connected wither with a loose gearwheel, which is mounted on the second input shaft on the drive side, of an eighth wheel plane, with an output-side hollow shaft that is coaxially mounted on the second input shaft to the second input shaft. The drive side hollow shaft of the second sub-transmission can support on the an output-side hollow shaft a drive-side fixed wheel of a seventh wheel plane. In addition, on the drive-side hollow shaft of the second sub-transmission can be loosely mounted a drive-side gearwheel of a sixth wheel plane. The hollow shaft can be drivingly connectable with its fifth switching elements SE-B to the loosely mounted drive-side gearwheel of the sixth wheel plane.

In a double function, the fifth switching element SE-B can also couple the drive-side gearwheel RE-5, which can be switched to the two partial transmissions, to the drive-side hollow shaft of the second partial transmission.

As mentioned above, a hollow shaft is coaxially mounted in the first sub-transmission on the output shaft, on which the output-side gearwheels are non-rotatably arranged on two wheel planes. In the same manner, an output-side hollow shaft can be coaxially and rotatably mounted also in the second sub-transmission. On the output-side hollow shaft of the second sub-transmission can be mounted the output-side gearwheel of two wheel planes, for example the seventh and the eighth wheel plane, which are arranged non-rotatably. In addition, the output shaft can be provided in the second sub-transmission with a sixth switching element SE-E, by means of which the output-side hollow shaft of the second sub-transmission can be coupled to the output shaft.

In an embodiment variant, the drive-side gearwheel of the fifth wheel plane, which can be switched to both sub-transmissions, can be arranged non-rotatably as a fixed gearwheel to the output shaft. In this case, a fifth wheel would be during the driving operation always rotated and it could prematurely wear out the rotary bearings. Against this background, the output-side gearwheel of the fifth wheel plane can be also loosely mounted on the output shaft and it can be coupled via a seventh switching element SE-G to the output shaft.

As mentioned above, at least one gearwheel of one sub-transmission can be coupled via a switching element, for instance a shifting clutch, to the other sub-transmission. In this manner, at least one forward gear can be skipped with a small technical expense related to the transmission and without having to forego the advantage of the acceleration without interruptions of the traction force, which is to say for example to shift without a delay from an forward odd gear to another forward gear. In particular with a strong motorization of the motor vehicle and with defined driving conditions, this can enable an improved acceleration occurring without gear delays and potentially also an improved efficiency during the driving operation.

It is particularly preferred when the gearwheel set can form at least the 3rd forward gear of the sub-transmission, which can be drivingly connected, directly or indirectly, to the input shaft of one or the other sub-transmission A, B. The result is that in addition to the regular switching strategy, a variant wherein switching can be carried out from the 1st gear to the 3rd gear and when required from this gear to the 5th gear can be carried out without interrupting the traction force.

If with a corresponding technical design of the transmission, said gearwheel is also integrated in the power flow of the 1st forward gear, the sub-transmission can be switched also here, so that an additional degree of freedom is provided for functionality.

In a preferred embodiment of the invention, the fixed gearwheel of the gearwheel set which can be switched to both sub-transmission can be arranged on the common output shaft of the shifting transmission, while the corresponding shifting loose gearwheel can be coupled with a simple technical control with the switching element SE-D of the sub-transmission A or with the switching element SE-B of the sub-transmission B. The switching elements can be in this case dual clutches, by means of which one gearwheel set of one sub-transmission or the gearwheel set of the other transmission can be switched.

In a preferred embodiment of the invention, only eight gear planes can be used with multiple use of the gearwheel sets for a 12-gear transmission, wherein the commonly used gearwheel set of one sub-transmission is arranged immediately adjacent to the other sub-transmission. The shifting transmission can have a relatively short construction and it can be designed with the smallest possible amount of the switching elements and gear adjustment elements.

In addition, the fixed gearwheel of several wheel planes or gear planes of both sub-transmission can be respectively attached to the common hollow shaft, which can be rotatably mounted on the common output shaft and which can be coupled via shifting clutches (which is to say switching elements) to the output shaft.

Furthermore, other fixed gearwheel of the planes can be arranged on a hollow shaft, which is mounted on the input shaft of one of the sub-transmissions and by means of which a shifting clutch can be coupled to said gearwheel set of the other sub-transmission.

Finally, with the smallest possible technical expense required for the transmission, the twelve forward gears can be switched by means of five dual clutches and one simple clutch, wherein four dual clutches are positioned on both coaxially arranged input shafts of the sub-transmission and one double clutch and a simple clutch is positioned on the common output shaft.

BRIEF DESCRIPTION OF THE DRAWING

An embodiment of the invention will be explained next in the following based on the attached figures. The figures show the following:

FIG. 2 is a switching matrix of a speed-change transmission according to FIG. 1.

DETAILED DESCRIPTION OF THE DRAWING

Figure 1:
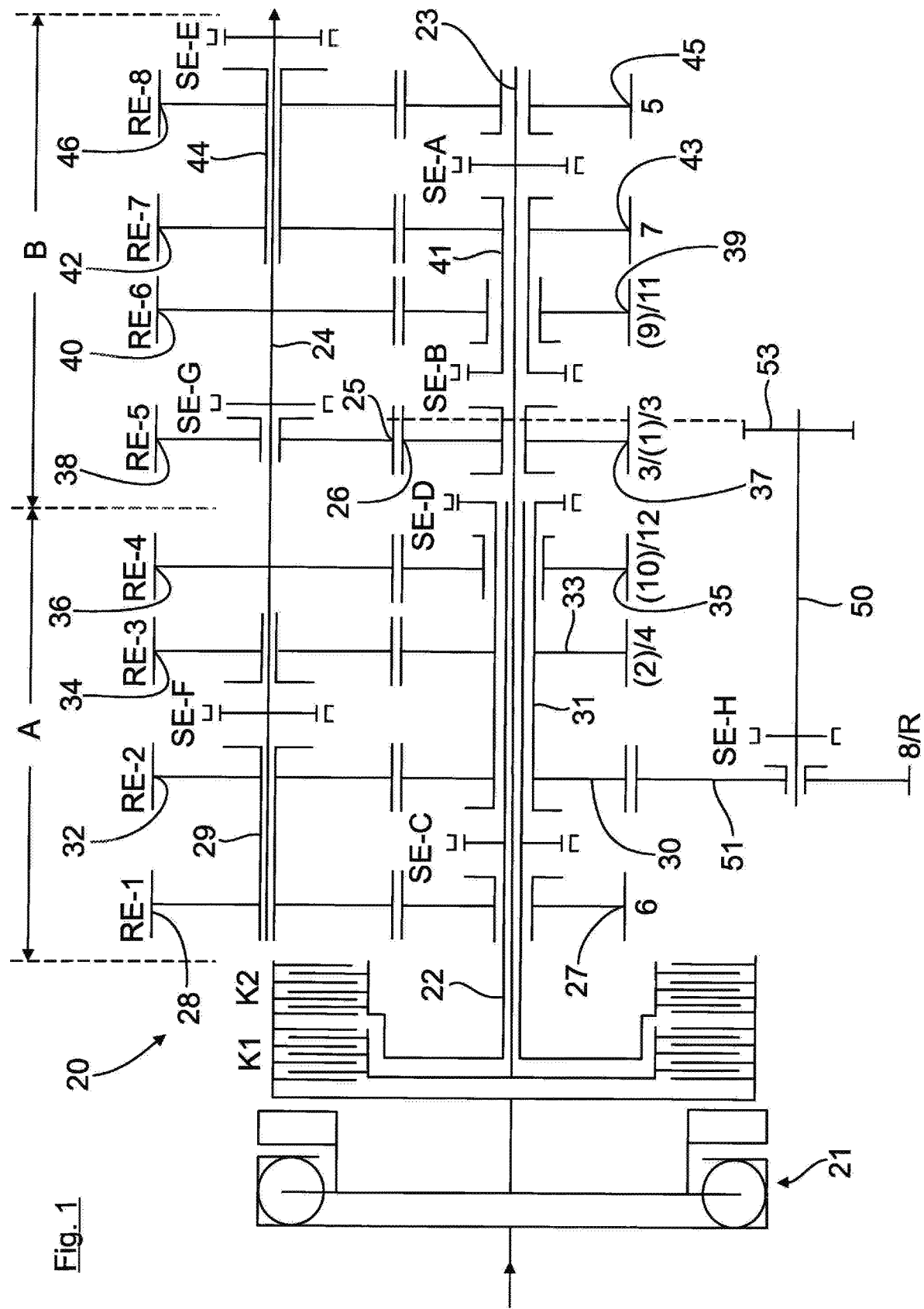
FIG. 1 is a block circuit diagram of a speed-change transmission for motor vehicles with two sub-transmissions, which can be activated via two load-switchable clutches and with 12 switchable forward gears, wherein a gearwheel of the transmission can be used for both sub-transmissions.

FIG. 1 shows a speed-change gearbox or a dual clutch transmission 20 for a motor vehicle, by means of which up to twelve forward gears 1 through 12 can be switched in eight wheel planes or with eight gearwheel sets RE-1 through RE-8. Each of the wheel planes RE-1 through RE-8 consists of a drive-side gearwheel, which is coaxial with the input shaft 22, 23, and an output-side gearwheel, which is coaxial to the output side 24.

The speed-change gearbox 20 is provided for example with an internal combustion engine (not shown) and a torsional vibration damper 21, which are drivingly connected and which can be alternately coupled via two load-shiftable clutches K1, K2 to input shafts 22, 23, among which the input shaft 22 is a hollow shaft, through which is mounted the second input shaft 23. The rotary bearing and the corresponding transmission housing are not shown.

The gearwheel sets or wheel planes RE-1 through RE-8 are arranged in a manner that will be explained later with switchable loose gearwheels and fixed gearwheels on the input shafts 22, 23 on a joint output shaft 24 in a manner that is per se known, wherein the gearwheel sets RE-1 through RE-4 form a first sub-transmission A and the gearwheel sets RE-5 through RE-8 form a second sub-transmission B.

The gearwheel set R-5 of the sub-transmission B is arranged with a loose gearwheel 38 on the output shaft 24 and with a switchable loose gearwheel 26 on the input shaft 23 axially immediately parallel to the sub-transmission A in such a way that its loose gear 27 can be coupled via a shifting clutch SE-D to the sub-transmission A, or via a switching clutch SE-B to the sub-transmission B.

The arrangement of the remaining gearwheel sets is such that with only eight gearwheel sets RE-1 through RE-8, 12 forward gears can be realized, wherein:

the loose gearwheel 27 of RE-1 is arranged on the input shaft 22 and its fixed gearwheel 28 is arranged on a hollow shaft 29 which is mounted coaxially to the output shaft 24, a fixed wheel (30) of RE-2 is mounted via a hollow shaft 31 on the input shaft 22 and the corresponding fixed gearwheel 32 is also mounted non-rotationally on the hollow shaft (29);

the loose gearwheel 27 and the hollow shaft 31 can be coupled by means of a switching clutch SE-C alternately to the input shaft 22;

a fixed gearwheel 33 of RE-3 is arranged on the hollow shaft 31, while its loose gearwheel 34 or the hollow shaft 29 can be alternately coupled via a shifting clutch SE-F to the output shaft 24;

on the hollow shaft 31 is further mounted a loose gearwheel 35 of the gearwheel set RE-4, which meshes with a fixed gearwheel 36 on the output shaft 24;

the loose gearwheel 37 of the gearwheel set RE-5 is mounted on the central input shaft 23 of the sub-transmission B immediately axially adjacent to the loose gearwheel 35 of the gear set RE-4, which is in engagement with the other loose gearwheel 38 on the output shaft 24;

both loose gearwheels 35, 37 can be alternately coupled via another shifting clutch SE-D to the hollow shaft 31 on the input shaft 22;

in addition, the loose gearwheel 37 can be coupled via a second shifting clutch SE-B to a hollow shaft 41 mounted on an input shaft 23, wherein the hollow shaft 41 supports a loose gearwheel 39 of the gearwheel set 41, which can be also coupled via the shifting clutch SE-B to the hollow shaft 41;

the loose gearwheel 39 of the gearwheel set RE-6 meshes with another fixed gearwheel 40 on the output shaft 24;

the hollow shaft 41 is further provided with a fixed gearwheel 43 of the gearwheel set RE-7, which is in engagement with a fixed gearwheel 42 with a hollow shaft 44 that is rotatably mounted on the drive shaft 24;

the hollow shaft 41 on the input shaft 23 can be further connected via a shifting clutch SE-A to the input shaft 23, wherein the shifting clutch SE-A alternately couples also a loose gearwheel 45 of the gearwheel set RE-8 to the input shaft 23;

the fixed gearwheel 46 of the gearwheel set RE-8 is analogously to the fixed gearwheel 42 of the RE-7 arranged on the hollow shaft 44, wherein the hollow shaft 44 can be connected via a simple shifting clutch SE-E to the output shaft 24.

The shifting clutches SE-C, SE-F, SE-D, SE-B and SE-A can be designed in the same manner ask know dual synchronizing clutches which are customary with shifting transmission (with a position of their switching sleeves shown in the drawing of FIG. 1 to the left (Ii) or to the right (re), and the shifting clutch SE-E can be designed as a simple synchronizing clutch (clutch position (Ii), which is controlled electronically with corresponding electrically/hydraulically controlled actuators, switched each time from a neutral position (as shown).

The clutches K1, K2 can be hydraulic, load-shiftable lamellar clutches, which alternately activate the sub-transmission A or B according to the corresponding preselection of the gear integrated in the drive torque.

The forward gears 1 through 12, (a rear gear, which may be eventually required, is not shown to simplify the explanation), can be switched according to the matrix of FIG. 2, wherein the respectively switched gears (G) 1 through 12 are listed in the left column of the matrix. The cross signs (X) indicate the gearwheel RE1 through RE8 which are included in the force flow of the respective gearwheel sets RE1 through RE8, and the designation (Ii) or (re) indicates the switching positions of the respective shifting clutches SE. It should be noted that the gears 1 and 3 are listed twice in the column G because they can be selectively switched via the sub-transmission B (clutch 1), or the sub-transmission A (clutch 2).

The regular switching sequence can be therefore 1-2-3-4-5 ff., wherein the 1st gear is activated via the clutch K1 (sub-transmission B) and the other gears through alternating closing of the clutches K2, K1, K2, etc. In the sub-transmission with the open clutch, the next gear can be preselected in the known manner, whereby the shifting can be performed without interrupting the traction force by shifting the clutches K1, K2.

In the modified shifting sequence, the 2nd gear, and when required also the 4th gear can be skipped without interrupting the traction force, wherein the force flow is controlled in the 1st gear with the clutch K1 or K2 (sub-transmission A or B), with a corresponding integration of the gearwheel sets RE-1 through RE-8 and with positioning of the switching clutches SE (see matrix). The result is that the 3rd gear and when required the 5th gear is already preselected and can be activated by shifting the load-shiftable clutch without interrupting the traction force.

It is thus possible to control in addition to the regular shifting sequence of the dual clutch transmission 20 the modified shifting sequences 1-3-4-5-6 ff. in the sequence K2, K1, K2, K1, K2 ff. or 1-3-5-6, ff., in the sequence K1, K2, K1, K2, ff., wherein the shifting sequences can be preset and/or adjusted manually depending on the operating data and driving parameters of the motor vehicle with an electronic transmission control.

As is further evident from the shifting matrix of FIG. 2, the forward gears 3 through 8 as well as 11 and 12 are designed as direct gears, which provided with exactly one wheel plane connected to the torque flow. In contrast to that, the forward gears 1, 2 and 9 as well as 10, which are realized not as direct gears, but as twist gears in exactly three wheel planes, are combined by means of the switching elements SA-A through SE-G and connected in the torque flow. By means of example, in the first forward gear (twist gear), the eighth, eleventh and fifth wheel planes RE-8, RE-7 and RE-5 are connected in the torque flow. In the 2nd forward gear (twist gear), the first, second and third wheel planes (RE-1, RE-2, RE-3) are connected in the torque flow. In the 9th forward gear (twist gear) are connected the eighth, seventh and sixth wheel planes RE-8, RE-7, RE-6. With an engaged 10th forward gear (twist gear), the first, second and fourth wheel planes RE-1, RE-2 and RE-4 are connected.

In order to provide the respective twist gears 1, 2 and 9 as well as 10, the three wheel planes to be shifted are either completely assigned to the first sub-transmission A, or completely assigned to the second sub-transmission B. This means that with a switched twist forward gear, only the sub-transmission provided with the three twist wheel planes is integrated in the torque flow of the engaged gear, while the other sub-transmission is completely decoupled from the torque flow.

In order to form a reverse gear R, a reverse gear shaft 50 bridging over both sub-transmission A, B is mounted axis-parallel to the input shafts 22, 23 and the output shaft 24 in a transmission housing of the dual clutch housing, not shown. The reverse gear shaft 50 supports two reversing gearwheels 51, 53, among which the first reversing gearwheel 51 meshes with the drive-side gearwheel 30 of the second wheel plane ER-2, and the second reversing gearwheel 53 meshes with the drive-side gearwheel 37 of the fifth wheel plane RE-5.

The first reversing gearwheel 51 cooperating with the second wheel plane RE-2 of the sub-transmission A is designed as a loose gearwheel and it can be coupled by means of a switching element SE-H, which is switchable on one side to the reverse gearwheel shaft 50. The reversing gearwheel 53, which is cooperating with the fifth gearwheel RE-5, is on the other hand designed as a fixed gearwheel.

The reverse gear R is activated by switching the switching element SE-C, supported by the first input shaft 22 in FIG. 1, to the left to the drive-side gearwheel 30 of the first wheel plane RE-1. In addition, the switching element SE-H is switched to the left to the first reversing gearwheel 51 and the output-side gearwheel 38 of the intermediate level RE-5 is coupled via the switching element SE-G to the output shaft 24. The reverse gear R is therefore a twist gear, wherein the torque flow passes with a closed separating torque K2 via the hollow input shaft 22 and the drive-side gearwheel 30 of the second wheel plane RE-2 to the first reversing gear 51 and further via the reverse gearwheel shaft 50 as well as the second reversing gearwheel 53 to the output-side gearwheel 38 of the intermediate wheel plane RE-5.

The invention claimed is:

1. A dual clutch for a motor vehicle, comprising:
gearwheel sets shiftable via shifting elements, which form exactly eight wheel planes arranged one after another in the sequence of the first through the eighth wheel plane of the dual clutch transmission in the axial direction from an input side to an output side, which are respectively assigned to a first sub-transmission and to a second sub-transmission, among which the first sub-transmission is provided with a first input shaft and the second sub-transmission is provided with a second input shaft, wherein the input shafts, which are coaxial to each other, can be alternately activated via a load-switchable clutch, and wherein at least some of the even forward gears are assigned to the first sub-transmission and at least some of the odd forward gears are assigned to the second sub-transmission, which can be shifted during a gear shift by a switching element, wherein the first sub-transmission is provided with at least the first, second and third wheel plane, among which each wheel planes are constructed with a drive-side gearwheel which is coaxial to the first input shaft and a gearwheel which is coaxial to an output shaft, wherein the output shaft is provided with a first switching element switchable on both sides in the axial direction, by which the first, second and third wheel plane of the first sub-transmission can be coupled to or decoupled from the output shaft, and wherein the output-side gearwheels of the first through third planes are mounted on the output shaft, and wherein in the axial direction on one side of the first switching element is arranged an output-side loose gearwheel of the third plane, and an output-side loose gearwheel of the second plane is mounted on an opposite side of the first switching element on the output shaft and wherein an output-side hollow shaft of the first sub-transmission is coaxially mounted on the output shaft, which can be alternately coupled via the first switching element to the output shaft, and wherein the output-side hollow shaft of the first sub-transmission non-rotatably supports the output-side gearwheels of the first and second wheel plane, wherein the first sub-transmission is provided with a fourth wheel plane whose output-side gearwheel is non-rotatably arranged on the output shaft, and the first input shaft of the first sub-transmission is provided with a second switching element operating on both sides in the axial direction, the second switching element being the only switching element on the first input shaft of the first sub-transmission, and that by the second switching element, the first input shaft can be coupled to or decoupled from all the wheel planes of the first sub-transmission.

2. The dual transmission clutch according to claim 1, wherein a drive-side loose gearwheel of the first wheel plane is mounted in the axial direction on one side of the second switching element on the first input shaft, and a coaxially mounted drive-side hollow shaft of the first sub-transmission is arranged on the opposite side of the second switching element on the first input shaft and that the loose gearwheel of the first wheel plane, and the drive-side hollow shaft of the first sub-transmission can be alternately coupled via the second switching element to the first input shaft, and the drive-side hollow shaft of the first sub-transmission supports fixed gearwheels of the second and third wheel planes.

3. The dual transmission clutch according to claim 2, wherein on the drive-side hollow shaft of the first sub-transmission is mounted a loosely mounted drive-side gearwheel of the fourth wheel plane, and the drive-side hollow shaft of the first sub-transmission is provided with a third switching element, by which the loosely mounted drive-side gearwheel of the fourth wheel plane can be coupled to the drive-side hollow shaft of the first sub-transmission.

4. The dual transmission clutch according to claim 3, wherein the second sub-transmission is provided with a fifth wheel plane immediately adjacent to the first sub-transmission in the axial direction, and the fifth wheel plane can be coupled by the third switching element to the first sub-transmission.

5. The dual transmission clutch according to claim 4, wherein the fifth wheel plane, which is switchable to both sub-transmissions is mounted with its drive-side gearwheel on the second input shaft and by the third switching element, the drive-side hollow shaft can be coupled to the first sub-transmission.

6. The dual transmission clutch according to claim 4, wherein the second input shaft of the second sub-transmission is provided with a fourth switching element, which is switchable on both sides in the axial direction, the fourth switching element being the only switching element on the second input shaft of the second sub-transmission, and that by the fourth switching element, the second input shaft can be coupled to or decoupled from the wheel planes of the second sub-transmission.

7. The dual transmission clutch according to claim 6, wherein a drive-side loose gearwheel of an eighth wheel plane, is arranged respectively on the second input shaft of the second sub-transmission on one side of the fourth switching element in the axial direction, and a drive-side hollow shaft is arranged coaxially on the second input shaft on the opposite side of the fourth switching element in the axial direction, which can be alternately coupled via the fourth switching element to the second input shaft, and the drive-side hollow shaft of the second sub-transmission supports at least one fixed wheel of a seventh wheel plane.

8. The dual transmission clutch according to claim 7, wherein on the drive-side hollow shaft of the second sub-transmission is mounted a drive-side gearwheel of a sixth wheel plane, and the drive-side hollow shaft of the second sub-transmission can be coupled by a fifth switching element to the mounted drive-side gearwheel of the sixth wheel plane.

9. The dual transmission clutch according to claim 8, wherein the drive-side gearwheel of the fifth wheel plane, which can be shifted to both sub-transmissions, can be coupled by the fifth switching element to the drive-side hollow shaft of the second sub-transmission.

10. The dual transmission clutch according to claim 4, wherein the output-side gearwheel of the fifth wheel plane switchable to both sub-transmissions is non-rotationally arranged as a fixed gearwheel on the output shaft, or the output-side gearwheel of the fifth wheel plane is mounted on the output shaft and can be coupled via a seventh switching element to the output shaft.

11. The dual transmission clutch according to claim 1, wherein the drive-side gearwheels of the seventh and eighth wheel plane of the second sub-transmission are non-rotationally arranged on an output-side hollow shaft of the second sub-transmission, which is coaxially and rotationally mounted on the output shaft.

12. The dual transmission clutch according to claim 11, wherein the output shaft is provided with a sixth switching element, by which the output hollow shaft of the second sub-transmission can be coupled to the output shaft.

* * * * *